July 9, 1946.   A. E. BIERMANN   2,403,573
MACHINE FOR MANUFACTURING SPIRAL VANES
Filed Dec. 24, 1941   3 Sheets-Sheet 1

INVENTOR
Arnold E. Biermann

INVENTOR
Arnold E. Biermann

Patented July 9, 1946

2,403,573

UNITED STATES PATENT OFFICE 2,403,573

MACHINE FOR MANUFACTURING SPIRAL VANES

Arnold E. Biermann, Hampton, Va.

Application December 24, 1941, Serial No. 424,328

5 Claims. (Cl. 90—15)

This invention relates to improvements to machines for manufacturing spiral shapes such as are required in the construction of the compressor described in U. S. Patent No. 2,090,280. The main object of the invention is to provide a practical machine for accurately generating the spiral surfaces required at a minimum of expense.

The surfaces of the spiral vanes of the compressor referred to are of such shape as to be impossible of accurate manufacture by means of conventional machine tools such as the lathe, milling machine or shaper or attachments to these machines. Apparently machines of any classification capable of performing this operation have not been devised.

The specific object of this invention is to provide a machine for constructing spiral vanes of such shape as would be generated between two surfaces of revolution when said surfaces revolve about a central axis and simultaneously revolve in a plane passing through the central axis. For the purpose intended, the spiral vanes only need be of such length as would be generated by one complete revolution of the generating surfaces. It is intended that means shall be provided in this invention as to permit cutting of the spiral vanes with rotary cutting devices such as milling cutters or abrasive wheels or by means of the reciprocating motion of a cuting tool or by the reciprocating motion of a rotating cutting tool.

With these and other objects in view, as well as other advantages that may be incident to use of the improvements, the invention consists in parts and combinations thereof hereinafter set forth and claimed, with the understanding that the necessary elements constituting the same may be varied in proportion and arrangement without departing from the nature and scope of the invention as defined in the appended claims.

In order to make the invention more clearly understood there are shown in the accompanying drawings, means for carrying the invention into practical use, without limiting the improvements in their useful application to the particular construction, which for the purpose of explanation have been made the subject of illustration.

Figure 2:
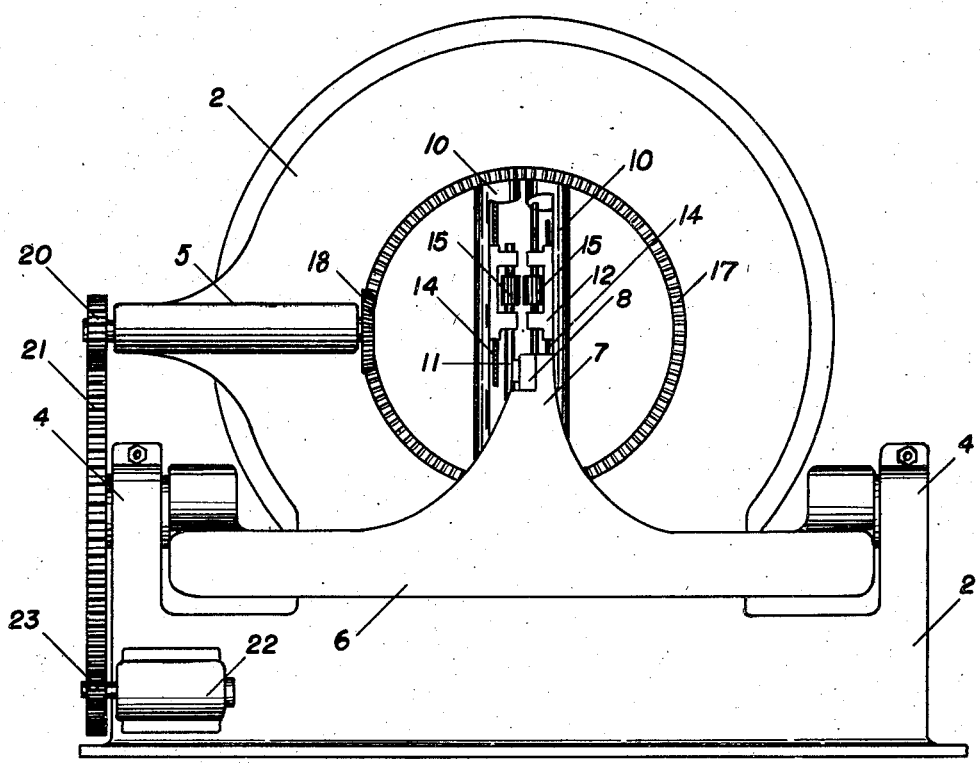
Figure 2 is a side view in elevation of a machine embodying the invention for cutting the spiral vanes shown in Figure 1.
Figure 1:
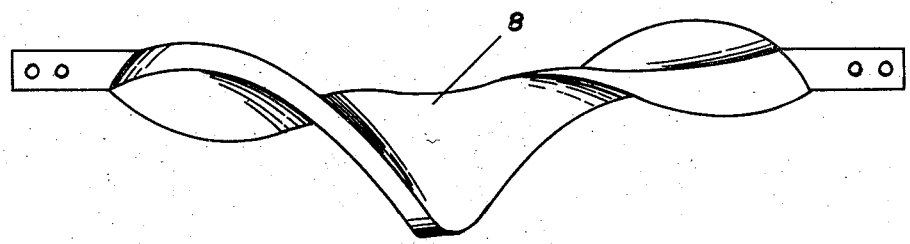
Figure 1 is a side view of a spiral vane in which the broad curved surfaces have been machined by means of this invention.
Figures 3, 4:
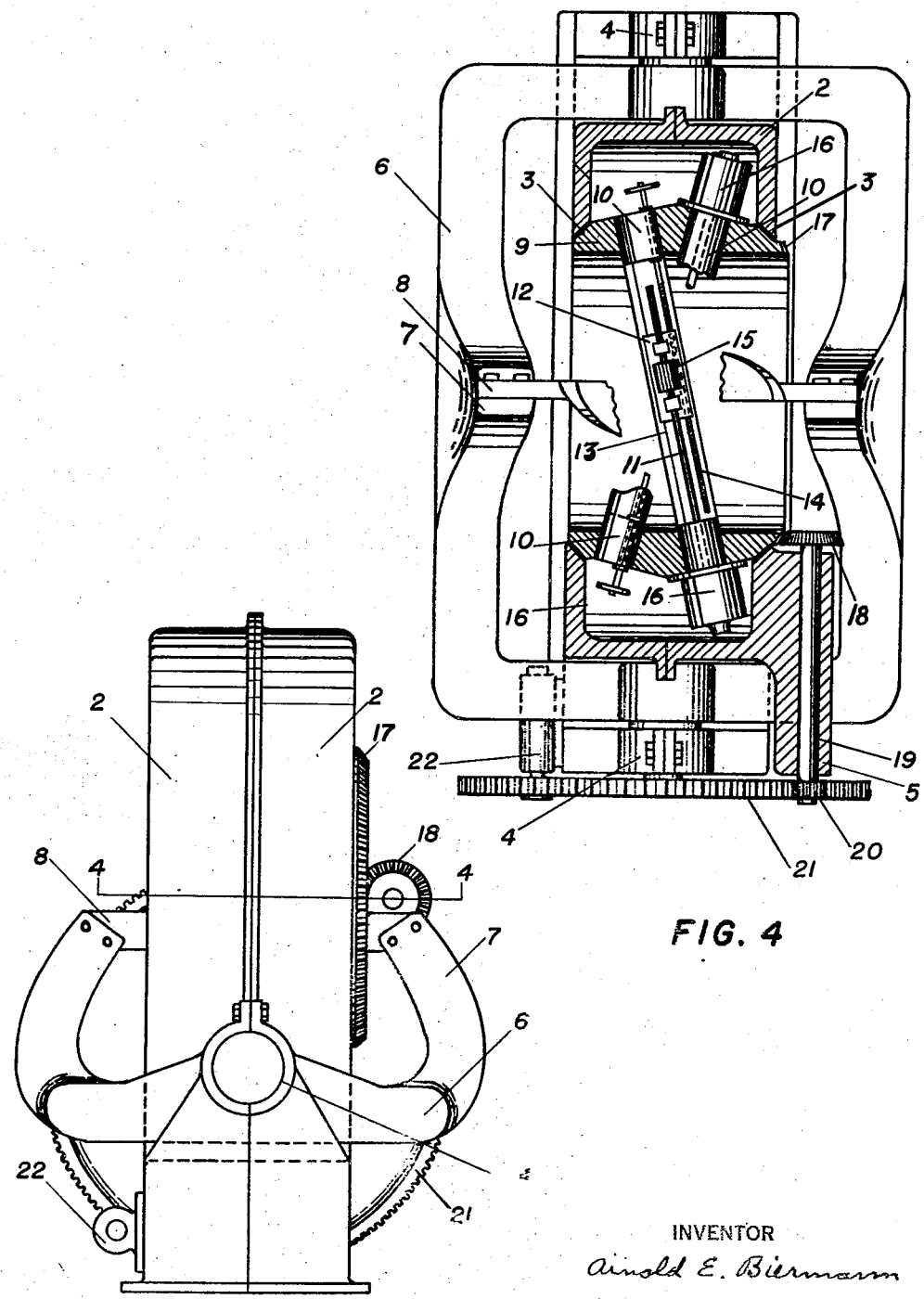
Figure 3 is an end view in elevation of the invention.
Figure 4 is a view taken from the top, partly in plan and partly as a section through line 4—4 of Figure 3.

Referring to the drawings indicated by the figure numbers 1, 2, 3 and 4, a machine constructed in accordance with the invention is shown as comprising a frame 2 which embodies the circular ways 3, the bearings 4 and the shaft support 5. The carriage 6, which is mounted for rotation in the bearings 4 embodies the arms 7 which support the stock to be machined 8. The rotary table 9, shown in Figure 4, which rotates in the slides 3 of the frame 2 embodies the cylindrical supports 10. The supports 10 are provided with shafts 11 which are supported on the tool carriages 12 which are arranged to slide in the guides 13. The tool carriage 12 is moved along the guides by means of the screw 14. The cutters 15, which may be interchanged with grinding wheels, are mounted on the shafts 11 and are turned by any suitable driving means such as the motor 16. The gear 17 is attached to the rotary table 9 and is driven by the gear 18 which is mounted on the shaft 19. Shaft 19 is mounted on the shaft support 5 and is driven by the gear 20 which engages the gear 21. The gear 21 is mounted for turning the carriage 6 and is driven by the motor 22 through the gear 23. It will be noted that the position of the rotary table 9 in Figure 4 is shown 90 degrees from its position in Figure 2.

In operation the stock to be machined is fixed on the arms 7 and as the rotary table 9 makes one turn the carriage 6 moves through an arc determined by the gear ratio employed between the table 9 and the carriage 6. As this movement takes place the rotary cutters 15 cut the stock to the desired shape. Feeding of the cutters is done by moving the tool carriages 12 along the slides 13 by means of the screws 14.

In the construction of the spiral vanes 8 it has been found in order to obtain the desired shape for most efficient operation and practical construction the axes of the generating cylinders (rotary cutters 15) must be inclined, one with respect to the other, and must be displaced, one from the other. This feature is provided in this invention.

It is found difficult to mill the spiral vanes 8 on one side at a time unless adequate support is provided opposite the milling cutter. This difficulty is obviated by using the milling cutters 15 on both sides of the stock simultaneously.

Figure 5:
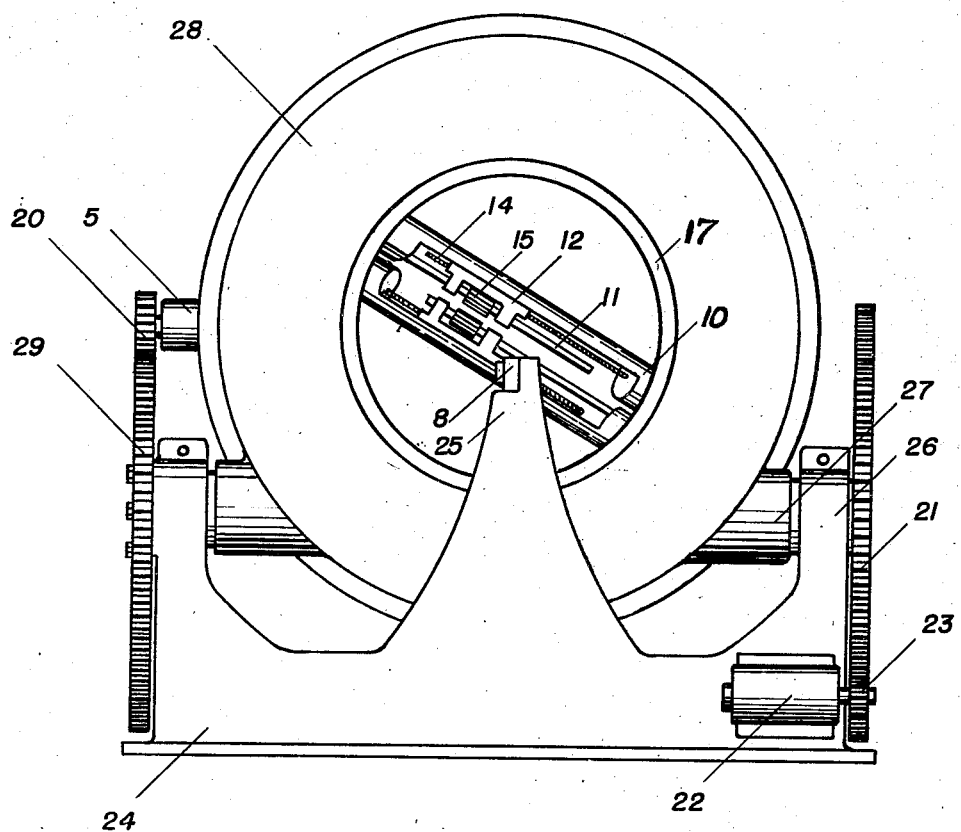
Figure 5 shows a side view of an alternate arrangement of the invention.

The alternate arrangement of the invention which is shown in Figure 5 achieves the same object by means of a slight modification of parts. In Figure 5 the base 24 supports the stock 8 by means of the arms 25. The base 24 embodies the bearings 26 which support the trunnions 27 of the frame 28. The gear 29 is fastened to the base 24. Gear 20 serves the same function as shown and described for a similar part in Figures 2 and 4. In Figure 5, gear 20 is driven by the stationary gear 29 as the frame 28 rotates on the trunnions 27, thus causing the gear 20 to revolve about gear 29. The remaining parts are similar and function similarly to those of the machine described by Figures 2, 3, and 4. It is obvious that this latter construction is in principle identical to the mechanism shown in the drawings with the exception that the stock is held stationary. The same relative movement is achieved in either mechanism.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

I claim:

1. A machine adapted for cutting spiral vanes comprising a frame, a work support for an elongated work piece carried by said frame, a tool table, means for rotating said tool table around the long axis of work carried by said support, means for effecting relative rocking movement between the table and work carried by said support at a fixed speed ratio relative to the rotation of the table, the plane of rotation of the table being substantially parallel to the axis of relative rocking movement, opposed rotary spindles mounted on said table adapted to receive the elongated work piece therebetween, cutters on said spindles for acting on opposite faces of the elongated work piece, and means on said table for advancing the cutters along said opposed faces of the work piece.

2. A machine adapted for cutting spiral vanes comprising a frame, a work support for an elongated work piece carried by said frame, a tool table, means for rotating the tool table around the long axis of work carried by said support, means for effecting relative rocking movement between the table and work carried by said support at a fixed speed ratio relative to the table, the plane of rotation of the table being substantially parallel to the axis of relative rocking movement, a pair of rotary spindles carried by the table, cutters mounted on said rotary spindles and arranged for simultaneously acting on opposite faces of work carried by said support, and said cutters having oppositely inclined axes.

3. In a machine of the class described, a frame, a work carriage for an elongated work piece tiltably mounted on the frame to tilt the work piece about an axis non-parallel to the length of the work piece, an apertured tool table receiving work on said carriage through the aperture thereof, means for rotating said tool table around said work about an axis spaced from the tilting axis of the carriage, means for rocking said carriage at a fixed speed ratio relative to said table, the axis of rotation of said carriage being substantially parallel to the plane of rotation of the table, and a tool rotatably mounted on said tool table in the aperture thereof for engaging the elongated work piece.

4. A machine of the character described comprising a frame, a work support thereon, a centrally apertured tool table receiving work on said support through the aperture thereof, means for rotating said tool table around said work, means for effecting relative rocking movement between the table and the work at a fixed speed ratio relative to the rotation of the table, the plane of rotation of the table being substantially parallel to the axis of relative rocking movement, and a tool carried by said table in the aperture thereof for engaging work carried by the work support.

5. In a machine of the character described, a frame, a work support on said frame, a centrally apertured tool table receiving work on said support through the aperture thereof, means for rotating said tool table around the work, means for tilting said tool table about an axis non-parallel to the length of the work at a fixed speed ratio relative to the rotation of the table, the plane of rotation of the table being substantially parallel to the rocking axis of the table, and cutters rotatably mounted in the aperture of the table for engaging opposite faces of the work.

ARNOLD E. BIERMANN.